M. A. SCHUSTER.
VEHICLE SPRING.
APPLICATION FILED MAY 24, 1913.

1,087,512.

Patented Feb. 17, 1914.

WITNESSES:
Charles Pickles
R. S. Berry

INVENTOR
Morris A. Schuster
BY G. H. Strong
ATTORNEY

UNITED STATES PATENT OFFICE.

MORRIS A. SCHUSTER, OF OAKLAND, CALIFORNIA.

VEHICLE-SPRING.

1,087,512.     Specification of Letters Patent.     Patented Feb. 17, 1914.

Application filed May 24, 1913. Serial No. 769,584.

*To all whom it may concern:*

Be it known that I, MORRIS A. SCHUSTER, a citizen of the United States, residing at Oakland, in the county of Alameda and State of California, have invented new and useful Improvements in Vehicle-Springs, of which the following is a specification.

This invention relates to a spring, and particularly pertains to a spring which is especially adapted for use on vehicles, such as automobiles, carriages, and the like.

It is the object of this invention to provide a spring combining the properties of strength, flexibility and lightness, and which is simple in construction and economical in manufacture.

Another object is to provide a spring which is so constructed and arranged as not to be liable to break when excessive strains are brought thereon, and which when placed between the body and the axle of a vehicle will serve to cushion the downward movement of the vehicle body in relation to the axle, and the upward movement of the axle in relation to the vehicle body.

Other objects will appear hereinafter.

The invention primarily resides in a pair of correspondingly-shaped spring members, oppositely disposed in relation to each other, and connected together at their terminations; said spring members consisting of laminated arcuate central portions arranged with their outer arcual faces toward each other, the arcuate central portion of each spring member being formed with reverse curved end portions which are pivotally connected to the end portions of the other spring members; said spring members being superposed in relation to each other with the upper member connected to the axle and the lower member connected to the vehicle body.

The invention further consists of the parts and the construction and combination of parts as hereinafter more fully described and claimed, having reference to the accompanying drawings, in which—

Figure 1:
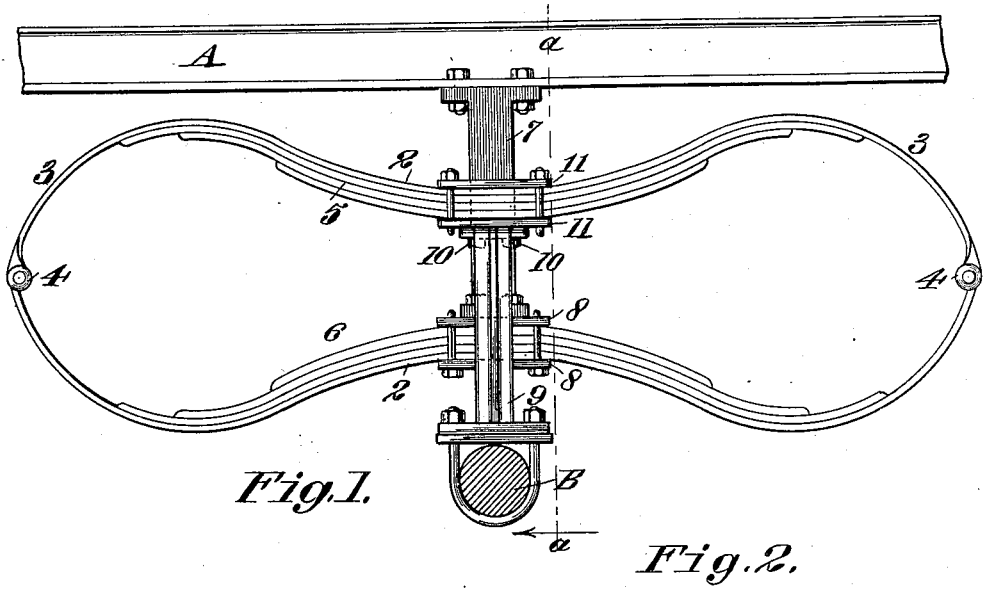
Figure 2:
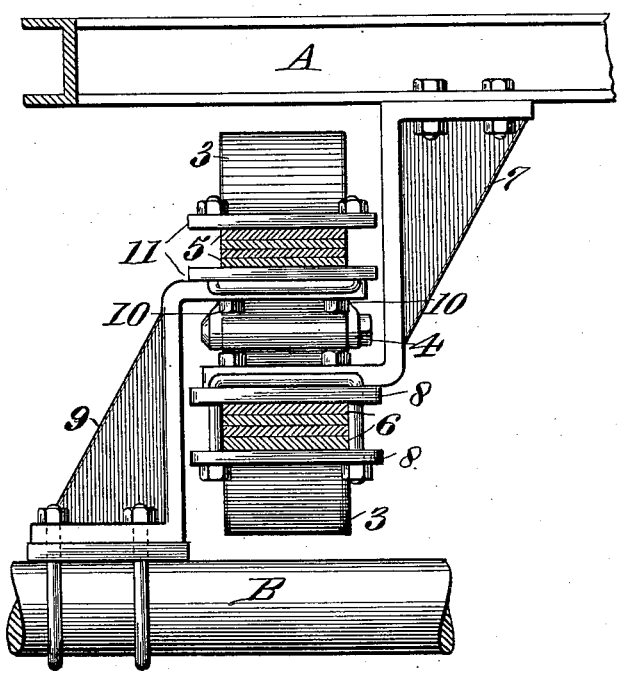

Figure 1 is a view in side elevation of the invention, as applied. Fig. 2 is an enlarged detail section and elevation on the line *a—a* of Fig. 1.

In the drawings A represents the frame of a vehicle body and B indicates the axle. The spring constituting the present invention is designed to be interposed between the frame A and the axle B, and is here shown as consisting of a pair of correspondingly-shaped plate spring members superposed in relation to each other, and spaced apart at their centers, and connected together at their ends. The central portions of the spring members are formed on an arc of a circle, as indicated at 2; the upper and lower members being curved in opposite directions in relation to each other, with the upper member curved downwardly and the lower member curved upwardly. The outer ends 3 of the arcuate portions 2 of the upper and lower spring members are formed on reversed curves, and terminate on a median line between the upper and lower spring members; the ends of the upper spring member being pivotally connected, as shown at 4, to the up-turned ends of the lower spring member.

Mounted on the underside of the upper spring member is a series of laminated plates 5, shaped to conform with the curvature of the spring member, and mounted on the upper face of the lower spring member 80 are laminated plates 6. The laminated plates 5 and 6 are provided for the purpose of adding strength to the spring members, as is common in elliptical spring construction.

A novel feature of this invention resides in attaching the upper spring member to the axle B, and the lower spring member to the vehicle frame A. These connections may be formed in any suitable manner. In this case I have shown the lower spring member as connected to a Z-shaped hanger 7, mounted on the underside of the frame A, with its lower portion extending between the superposed spring members and bolted to binding plates 8, mounted on and clamping the laminated plates 6 to the center arcuate portion 2 of the lower spring member. A Z-shaped standard 9, rigidly mounted on the axle B, extends upward on one side of the lower spring member 2 and projects inwardly beneath the upper spring member, and is secured to the latter by means of bolts 10, which are screwed into binding plates 11, mounted on the upper spring member; the binding plates 11 serving to secure the laminated plates 5 in position on the arcuate central portion 2 of the upper spring member. It is manifest, however, that any suitable means may be employed for connecting the vehicle body and axle B to their respective lower and upper spring members.

In the operation of the invention when the vehicle body A is moved in a downward direction, it will operate with a tendency to straighten the central portion of the lower spring member in opposition to the tension thereof, and will also exert a downward pull on the outer ends of the upper spring member, tending to straighten its central portion in opposition to the tension thereof. When the axle B is moved upward in relation to the vehicle body A, it will operate to tend to straighten the central portion of the upper spring member, and will exert an upward pull on the outer ends of the lower spring member.

From the foregoing it will be seen that the superposed spring members coöperate in cushioning the movement of the vehicle frame and axle in relation to each other, and that they will operate jointly both on the initial compression of the springs and on the rebound movement thereof; the compressive and expansive forces of one spring member being transmitted to the other spring member through their end connections.

Having thus described my invention, what I claim and desire to secure by Letters Patent is:

1. The combination with a vehicle body and its axle, of leaf springs having the central portions bowed toward each other and the outer ends reversely curved and concaved toward each other and pivoted together, and the central portion of the upper spring connected with the axle and the central portion of the lower spring connected with the vehicle body.

2. A vehicle spring composed of reversely curved members, the outer ends convexly bowed toward each other and pinned together, and the central portion bowed in the opposite direction, and connections by which the central portions are suspended, the lower member from the vehicle frame and the upper member from the axle.

3. Vehicle springs suspended between and out of contact with the frame and axle, and brackets fixed to the frame and the axle and having hanger arms extending between the springs, the hanger of the upper frame bracket being connected with the lower spring and the hanger of the lower axle bracket connected with the upper spring, the outer ends of said springs being bowed toward each other and flexibly pinned together.

4. A vehicle spring composed of upper and lower members suspended between the frame and axle having their outer ends pivotally connected, and hangers fixed to the frame and axle and extending between the springs, the upper and lower hangers being connected respectively with the lower and upper spring members.

In testimony whereof I have hereunto set my hand in the presence of two subscribing witnesses.

MORRIS A. SCHUSTER.

Witnesses:
  H. C. W. STEINBECK,
  A. L. THEISS.

---

Copies of this patent may be obtained for five cents each, by addressing the "Commissioner of Patents, Washington, D. C."